(12) United States Patent
Boll et al.

(10) Patent No.: US 9,923,232 B2
(45) Date of Patent: Mar. 20, 2018

(54) PRODUCTION OF HIGH-PURITY LITHIUM FLUORIDE

(71) Applicant: LANXESS Deutschland GMBH, Cologne (DE)

(72) Inventors: Matthias Boll, Cologne (DE); Wolfgang Ebenbeck, Leverkusen (DE); Eberhard Kuckert, Leverkusen (DE)

(73) Assignee: LANXESS DEUTSCHLAND GMBH, Cologne (DE)

( * ) Notice: Subject to any disclaimer, the term of this patent is extended or adjusted under 35 U.S.C. 154(b) by 0 days.

(21) Appl. No.: 14/402,141

(22) PCT Filed: May 23, 2013

(86) PCT No.: PCT/EP2013/060652
§ 371 (c)(1),
(2) Date: Nov. 19, 2014

(87) PCT Pub. No.: WO2013/174938
PCT Pub. Date: Nov. 28, 2013

(65) Prior Publication Data
US 2015/0140332 A1    May 21, 2015

(30) Foreign Application Priority Data
May 25, 2012 (EP) .................................... 12169563

(51) Int. Cl.
| | | |
|---|---|---|
| *H01M 10/00* | (2006.01) | |
| *H01M 10/0562* | (2010.01) | |
| *C01B 25/455* | (2006.01) | |
| *C01D 15/04* | (2006.01) | |
| *C22B 26/12* | (2006.01) | |
| *H01M 10/0525* | (2010.01) | |

(52) U.S. Cl.
CPC ....... *H01M 10/0562* (2013.01); *C01B 25/455* (2013.01); *C01D 15/04* (2013.01); *C22B 26/12* (2013.01); *H01M 10/0525* (2013.01); *C01P 2004/60* (2013.01); *C01P 2004/61* (2013.01); *C01P 2006/40* (2013.01); *H01M 2300/008* (2013.01); *Y10T 428/2982* (2015.01)

(58) Field of Classification Search
CPC ....... C01B 25/455; C01D 15/04; C22B 26/12; H01M 10/0525; H01M 10/0562
USPC .............................................. 423/179.5, 490
See application file for complete search history.

(56) References Cited

U.S. PATENT DOCUMENTS

| | | | |
|---|---|---|---|
| 4,013,796 A * | 3/1977 | Swinehart ................ | G02B 1/00 264/1.23 |
| 6,592,832 B1 | 7/2003 | Friedrich et al. | |
| 7,981,388 B2 | 7/2011 | Ivanov et al. | |
| 2011/0111288 A1 | 5/2011 | Nishida et al. | |
| 2011/0200508 A1 | 8/2011 | Harrison et al. | |

FOREIGN PATENT DOCUMENTS

| | | |
|---|---|---|
| CN | 101570337 A | 11/2009 |
| CN | 101723414 A | 6/2010 |
| CN | 101723415 A | 6/2010 |
| CN | 102030344 A | 4/2011 |
| DE | 19712988 A1 | 1/1998 |
| JP | 2008156190 A2 | 7/2008 |
| RU | 2277068 * | 5/2006 |

OTHER PUBLICATIONS

Translation of RU 2277068, May 27, 2006.*
European Search Report from co-pending Application EP12169563 dated Nov. 1, 2012 pages.

* cited by examiner

*Primary Examiner* — Steven Bos

(57) ABSTRACT

The present invention relates to a process for preparing high-purity lithium fluoride proceeding from lithium carbonate, and to lithium fluoride having a preferred morphology.

18 Claims, 1 Drawing Sheet

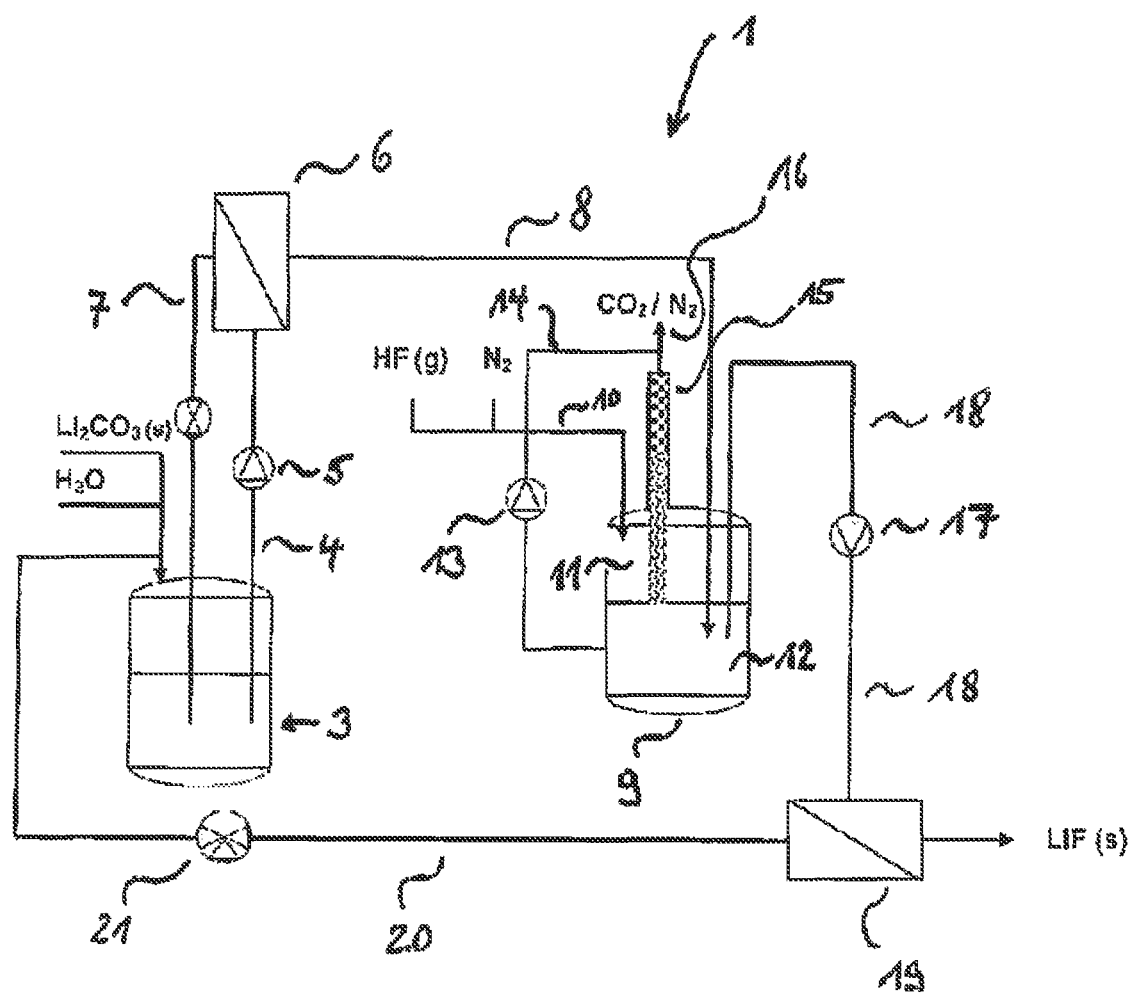

PRODUCTION OF HIGH-PURITY LITHIUM FLUORIDE

The present invention relates to a process for preparing high-purity lithium fluoride proceeding from lithium carbonate, and to lithium fluoride having a preferred morphology.

Lithium compounds, for example lithium hexafluorophosphate ($LiPF_6$), and lithium tetrafluoroborate ($LiBF_4$), have gained high industrial significance particularly as conductive salts in the production of high-performance accumulators. Further lithium compounds, for example lithium hexafluoroarsenate ($LiAsF_6$), lithium hexafluorostibate ($LiSbF_6$), lithium fluoroperfluoroalkylphosphinates ($LiPF(R^F)_3$) and lithium difluorophosphate ($LiPO_2F_2$), are currently the subject of intense examination for suitability for the same purpose.

In order to assure the ability of such accumulators to function and the lifetime and hence the quality thereof, it is particularly important that the lithium compounds used are of high purity and, more particularly, contain minimum proportions of other metal ions such as, more particularly, sodium or potassium ions and minimum amounts of corrosive chloride. Extraneous metal ions are held responsible for cell short-circuits owing to precipitate formation (U.S. Pat. No. 7,981,388).

For the preparation of lithium hexafluorophosphate ($LiPF_6$), lithium fluoroperfluoroalkylphosphinates ($LiPF(R^F)_3$), lithium difluorophosphate ($LiPO_2F_2$), lithium hexafluoroarsenate ($LiAsF_6$), lithium hexafluorostibate ($LiSbF_6$) and lithium tetrafluoroborate ($LiBF_4$) or similar fluorine-containing conductive salts in the required purity, lithium fluoride already having a very high purity is typically used. The literature therefore frequently also specifies very pure lithium fluoride as "battery grade".

Because of this requirement, the prior art has already described a number of processes for obtaining very pure lithium fluoride.

DE 198 09 420 A1 discloses a process for preparing and purifying lithium fluoride from technical grade lithium carbonate, wherein a) sparingly water-soluble lithium carbonate is first converted to lithium hydrogencarbonate using carbon dioxide and at the same time dissolved,
b) the solution of lithium hydrogencarbonate thus obtained is then pumped through an ion exchanger (LEWATITTP 207), in order to remove extraneous metal ions,
c) purified lithium carbonate is precipitated out of the lithium hydrogencarbonate solution thus purified by removing carbon dioxide and
d) the purified lithium carbonate is finally admixed with aqueous hydrofluoric acid in order to obtain pure lithium fluoride.

The yield of lithium fluoride by this process is 66.4% based on the amount of lithium carbonate used.

RU 2 330 811 A discloses a process for preparing lithium fluoride from technical grade lithium carbonate, wherein pure lithium carbonate is likewise obtained at first by reaction with carbon dioxide, purification of the lithium hydrogencarbonate solution obtained with an ion exchanger and removal of carbon dioxide. The lithium carbonate is then converted again to lithium hydrogencarbonate, and converted to lithium fluoride by addition of aqueous hydrofluoric acid.

Further processes in which lithium fluoride is obtained proceeding from readily available technical grade lithium carbonate by reaction of lithium hydrogencarbonate or prepurified lithium carbonate with hydrofluoric acid, anhydrous hydrogen fluoride or ammonium fluoride are also known, for example, from US2011/0200508 A, CN 102030344 A, CN 10198022 A, CN 101723413 A, CN101723414 A, CN101723415 A and CN101570337 A.

A common factor in the aforementioned processes is that either a separate purification step is required for the lithium carbonate used or the conversion to lithium fluoride is effected only after complete conversion to lithium hydrogencarbonate, which is of better water solubility.

The prior art shows that it is technically very complex to achieve high purities and, consequently, not every purity requirement can be fulfilled by the processes known to date for preparing or purifying lithium fluoride.

Accordingly, the problem addressed by the present invention was that of providing an efficient process for preparing high-purity lithium fluoride which does not require any complex purifying operations and gives constantly high yields, and with which it is possible to prepare lithium fluoride in a morphology which allows the problem-free use thereof in subsequent reactions.

The solution to the problem and the subject-matter of the present invention is a process for preparing lithium fluoride comprising at least the steps of:

a) providing an aqueous medium comprising dissolved lithium carbonate
b) reacting the aqueous medium provided in a) with gaseous hydrogen fluoride to give an aqueous suspension of solid lithium fluoride
c) separating the solid lithium fluoride from the aqueous suspension
d) drying the separated lithium fluoride.

It should be noted at this point that the scope of the invention includes any and all possible combinations of the components, ranges of values and/or process parameters mentioned above and cited hereinafter, in general terms or within areas of preference.

In step a), an aqueous solution comprising lithium carbonate is provided.

In the context of the invention, the term "aqueous medium comprising dissolved lithium carbonate" is understood to mean a liquid medium which i) contains dissolved lithium carbonate, preferably in an amount of at least 2.0 g/l, more preferably 5.0 g/l up to the maximum solubility in the aqueous medium at the selected temperature, most preferably 7.0 g/l up to the maximum solubility in the aqueous medium at the selected temperature. More particularly, the lithium carbonate content is 7.2 to 15.4 g/l. The person skilled in the art is aware that the solubility of lithium carbonate is 15.4 g/l in pure water at 0° C., 13.3 g/l at 20° C., 10.1 g/l at 60° C. and 7.2 g/l at 100° C., and consequently certain concentrations can be obtained only at particular temperatures.

ii) contains a proportion by weight of at least 50% water, preferably 80% by weight, more preferably at least 90% by weight, based on the total weight of the liquid medium, and iii) is preferably also solids-free or has a solids content of more than 0.0 up to 0.5% by weight, is preferably solids-free or has a solids content of more than 0.0 up to 0.1% by weight, is more preferably solids-free or has a solids content of more than 0.0 up to 0.005% by weight, and is more preferably solids-free, where the sum total of components i), ii) and preferably iii) is not more than 100% by weight, preferably 98 to 100% by weight and more preferably 99 to 100% by weight, based on the total weight of the aqueous medium comprising dissolved lithium carbonate.

The aqueous medium comprising dissolved lithium carbonate may comprise, in a further embodiment of the invention, as a further component, iv) at least one water-miscible organic solvent. Suitable water-miscible organic solvents are, for example, monopolyhydric alcohols such as methanol, ethanol, n-propanol, isopropanol, n -butanol, ethylene glycol, ethylene glycol monomethyl ether, ethylene glycol monoethyl ether, propylene glycol, propane-1,3-diol or glycerol, ketones such as acetone or ethyl methyl ketone.

If the aqueous medium comprising dissolved lithium carbonate comprises at least one water-miscible organic solvent, the proportion thereof may, for example, be more than 0.0% by weight to 20% by weight, preferably 2 to 10% by weight, where the sum total in each case of components i), ii), iii) and iv) is not more than 100% by weight, preferably 95 to 100% by weight and more preferably 98 to 100% by weight, based on the total weight of the aqueous medium comprising dissolved lithium carbonate.

Preferably, however, the aqueous medium comprising dissolved lithium carbonate is free of water -miscible organic solvents.

The aqueous medium comprising dissolved lithium carbonate may comprise, in a further embodiment of the invention, as a further component, v) a complexing agent, preferably in an amount of 0.001 to 1% by weight, preferably 0.005 to 0.2% by weight, based on the total weight of the aqueous medium comprising dissolved lithium carbonate.

Complexing agents are preferably those whose complexes with calcium ions and magnesium ions have a solubility of more than 0.02 mol/l at a pH of 8 and 20° C. Examples of suitable complexing agents are ethylenediaminetetraacetic acid (EDTA) and the alkali metal or ammonium salts thereof, preference being given to ethyleriediaminetetraacetic acid.

In one embodiment of the invention, however, the aqueous medium comprising dissolved lithium carbonate is free of complexing agents.

The procedure for provision of the aqueous solution comprising lithium carbonate is preferably to contact solid lithium carbonate with an aqueous medium which is free of lithium carbonate or low in lithium carbonate, such that the solid lithium carbonate at least partly goes into solution. An aqueous medium low in lithium carbonate is understood to mean an aqueous medium which has a lithium carbonate content of up to 1.0 g/l, preferably of up to 0.5 g/l, but is not free of lithium carbonate.

The aqueous medium used for the provision fulfils the conditions mentioned above under ii) and iii), and optionally includes components iv) and v).

In the simplest case, the aqueous medium is water, preferably water having a specific electrical resistivity of 5 MΩ·cm at 25° C. or more.

In a preferred embodiment, steps a) to d) are repeated once or more than once. In this case, in the repetition for provision of the aqueous medium comprising dissolved lithium carbonate, the aqueous medium free of lithium carbonate or low in lithium carbonate used is the aqueous medium which is obtained in a preceding step c) in the separation of solid lithium fluoride from the aqueous suspension of lithium fluoride. In this case, the aqueous medium free of lithium carbonate or low in lithium carbonate comprises dissolved lithium fluoride, typically up to the saturation limit at the particular temperature.

In one embodiment, the aqueous medium free of or low in lithium carbonate can be contacted with the solid lithium carbonate in a stirred reactor, a flow reactor or any other apparatus known to those skilled in the art for the contacting of solid substances with liquid substances. Preferably, for the purpose of a short residence time and the attainment of a lithium carbonate concentration very close to the saturation point in the aqueous medium used, an excess of lithium carbonate is used, i.e. a sufficient amount that full dissolution of the solid lithium carbonate is not possible. In order to limit the solids content in accordance with ii) in this case, there follows a filtration, sedimentation, centrifugation or any other process which is known to those skilled in the art for separation of solids out of or from liquid, preference being given to filtration.

If process steps a) to c) are performed repeatedly and/or continuously, filtration through a crossflow filter is preferred.

The contacting temperature may be, for example, from the freezing point to the boiling point of the aqueous medium used, preferably 0 to 100° C., more preferably 10 to 60° C. and more preferably 10 to 35° C., especially 16 to 24°C.

The contacting pressure may, for example, be 100 hPa to 2 MPa, preferably 900 hPa to 1200 hPa; especially ambient pressure is particularly preferred.

In the context of the invention, technical grade lithium carbonate is understood to mean lithium carbonate having a purity level of 95.0 to 99.9% by weight, preferably 98.0 to 99.8% by weight and more preferably 98.5 to 99.8% by weight, based on anhydrous product.

Preferably, the technical grade lithium carbonate further comprises extraneous ions, i.e. ions that are not lithium or carbonate ions, in 1) a content of 200 to 5000 ppm, preferably 300 to 2000 ppm and more preferably 500 to 1200 ppm of sodium in ionic form and/or
2) a content of 5 to 1000 ppm, preferably 10 to 600 ppm, of potassium in ionic form and/or
3) a content of 50 to 1000 ppm, preferably 100 to 500 ppm and more preferably 100 to 400 ppm of calcium in ionic form and/or
4) a content of 20 to 500 ppm, preferably 20 to 200 ppm and more preferably 50 to 100 ppm of magnesium in ionic form.

In addition, the technical grade lithium carbonate further comprises extraneous ions, i.e. ions that are not lithium or carbonate ions, in i) a content of 50 to 1000 ppm, preferably 100 to 800 ppm, of sulphate and/or
ii) a content of 10 to 1000 ppm, preferably 100 to 500 ppm, of chloride, likewise based on the anhydrous product.

It is generally the case that the sum total of lithium carbonate and the aforementioned extraneous ions 1) to 4) and any i) and ii) does not exceed 1 000 000 ppm, based on the total weight of the technical grade lithium carbonate based on the anhydrous product.

In a further embodiment, the technical grade lithium carbonate has a purity of 98.5 to 99.5% by weight and a content of 500 to 2000 ppm of extraneous metal ions, i.e. sodium, potassium, magnesium and calcium.

In a further embodiment, the technical grade lithium carbonate additionally has a content of 100 to 800 ppm of extraneous anions, i.e. sulphate or chloride, based on the anhydrous product.

The ppm figures given here, unless explicitly stated otherwise, are based on parts by weight; the contents of the cations and anions mentioned are determined by ion chromatography, unless stated otherwise according to the details in the experimental section.

In one embodiment of the process according to the invention, the provision of the aqueous medium comprising lithium carbonate and the contacting of an aqueous medium free of or low in lithium carbonate are effected batchwise continuously, preference being given to continuous performance.

The aqueous medium comprising dissolved lithium carbonate provided in step a) typically has a pH of 8.3 to 12.0, preferably of 9.0 to 11.5, measured or calculated at 20° C. and 1013 hPa.

Before the aqueous medium comprising dissolved lithium carbonate provided in step a) is used in step b), it can be passed through an ion exchanger, in order to at least partly remove calcium and magnesium ions in particular. For this purpose, it is possible to use, for example, weakly or else strongly acidic cation exchangers. For use in the process according to the invention, the ion exchangers can be used in devices such as flow columns, for example, filled with the above-described cation exchangers, for example in the form of powders, beads or granules.

Particularly suitable ion exchangers are those comprising copolymers of at least styrene and divinylbenzene, which additionally contain, for example, aminoalkylenephosphonic acid groups or iminodiacetic acid groups.

Ion exchangers of this kind are, for example, those of the LEWATIT™ type, for example LEWATIT™ OC 1060 (AMP type), LEWATIT™ TP 208 (IDA type), LEWATIT™ E 304/88, LEWATIT™ S 108, LEWATIT™ TP 207, LEWATIT™ S 100; those of the AMBERLITE™ type, for example AMBERLITE™ 120, AMBERLITE™ IRA 743; those of the DOWEX™ type, for example DOWEX™ HCR; those of the DUOLITE™ type, for example DUOLITE™ C 20, DUOLITE™ C 467, DUOLITE™ FS 346; and those of the IMAC™ type, for example IMAC™ TMR, preference being given to LEWATIT™ types.

Preference is given to using ion exchangers having minimum sodium levels.

In one embodiment of the process according to the invention, no treatment with ion exchangers takes place.

In step b), the aqueous medium comprising dissolved lithium carbonate provided in step a) is reacted with gaseous hydrogen fluoride to give an aqueous suspension of solid lithium fluoride.

The reaction can be effected by introducing or passing a gas stream comprising gaseous hydrogen fluoride into or over the aqueous medium comprising lithium carbonate, or by spraying or nebulizing the aqueous medium comprising dissolved lithium carbonate, or causing it to flow, into or through a gas comprising gaseous hydrogen fluoride.

Because of the very high solubility of gaseous hydrogen fluoride in aqueous media, preference is given to passing it over, spraying it, nebulizing it or passing it through, even further preference being given to passing it over.

The gas stream comprising gaseous hydrogen fluoride or gas comprising gaseous hydrogen fluoride used may either be gaseous hydrogen fluoride as such or a gas comprising gaseous hydrogen fluoride and an inert gas, an inert gas being understood to mean a gas which does not react with lithium fluoride or hydrogen fluoride or water under the customary reaction conditions. Examples are air, nitrogen, argon and other noble gases or carbon dioxide, preference being given to air and even more so to nitrogen.

The proportion of inert gas may vary as desired and is, for example, 0.01 to 99% by volume, preferably to 1 to 20% by volume.

In a preferred embodiment, the gaseous hydrogen fluoride used contains 50 ppm of arsenic in the form of arsenic compounds or less, preferably 10 ppm or less. The stated arsenic contents are determined photometrically after conversion to hydrogen arsenide and the reaction thereof with silver diethyldithiocarbamate to give a red colour complex (spectrophotometer, e.g. LKB Biochrom, Ultrospec) at 530 nm.

In a likewise preferred embodiment, the gaseous hydrogen fluoride used contains 100 ppm of hexafluorosilicic acid or less, preferably 50 ppm or less. The hexafluorosilicic acid contents reported is determined photometrically as silicomolybdic acid and the reduction thereof with ascorbic acid to give a blue colour complex (spectrophotometer, e.g. LK Biochrom, Ultrospec). Disruptive influences by fluorides are suppressed by boric acid, and disruptive reactions of phosphate and arsenic by addition of tartaric acid.

The reaction in step b) forms lithium fluoride, which precipitates out because of the fact that it is more sparingly soluble in the aqueous medium than lithium carbonate, and consequently forms an aqueous suspension of solid lithium fluoride. The person skilled in the art is aware that lithium fluoride has a solubility of about 2.7 g/l at 20° C.

The reaction is preferably effected in such a way that the resulting aqueous suspension of solid lithium fluoride attains a pH of 3.5 to 8.0, preferably 4.0 to 7.5 and more preferably 5.0 to 7.2. Carbon dioxide is released at these pH values. In order to enable the release thereof from the suspension, it is advantageous, for example, to stir the suspension or to pass it through static mixing elements.

The applicant suspects, without wishing to make any definitive scientific statement, that the reaction with gaseous hydrogen fluoride, unlike in the prior art, in which aqueous hydrofluoric acid in particular is used, does not result in occurrence of any high local concentrations of fluoride and lithium compounds such as lithium hydrogencarbonate, and the consequence is to enable the precipitation of unusually pure lithium fluoride in the first place. In addition, it is observed that the lithium fluoride is obtained in a morphological form which is particularly advantageous in downstream processes, especially in the preparation of complex salts such as lithium hexafluorophosphate.

Therefore, the invention also encompasses lithium fluoride having a D50 of 15 to 1000 μm, preferably 15 to 300 μm, more preferably 15 to 200 μm and even more preferably 20 to 200 μm.

The lithium fluoride also preferably has a D10 of 5 μm or more, preferably 10 μm or more. In another embodiment, for lithium fluoride has a D10 of 15 μm or more.

The D50 and the D10 mean, respectively, the particle size at which and below which 10% by volume and 50% by volume of the lithium fluoride is present.

The lithium fluoride additionally preferably has a bulk density of 0.8 g/cm$^3$ or more, preferably 0.9 g/cm$^3$ or more and more preferably of 0.9 g/cm$^3$ to 1.2 g/cm$^3$.

The lithium fluoride additionally preferably has a purity level of 99.9000 to 99.9995% by weight, preferably 99.9500 to 99.9995% by weight and more preferably 99.9700 to 99.9995% by weight, based on anhydrous product.

The lithium fluoride additionally preferably contains extraneous ions in
1) a content of 0.1 to 75 ppm, preferably 0.1 to 50 ppm and more preferably 0.5 to 10 ppm and more preferably 0.5 to 5 ppm of sodium in ionic form and/or 2) a content of 0.01 to 10 ppm, preferably 0.5 to 5 ppm and more preferably 0.1 to 1 ppm of potassium in ionic form.

The lithium fluoride additionally preferably contains extraneous ions in 3) a content of 0.05 to 300 ppm, preferably 0.1 to 250 ppm and more preferably 0.5 to 100 ppm of calcium in ionic form and/or
4) a content of 0.05 to 300 ppm, preferably 0.1 to 250 ppm and more preferably 0.5 to 50 ppm of magnesium in ionic form.

The lithium fluoride additionally contains, for example, extraneous ions in 5) a content of 0.1 to 100 ppm, preferably 0.5 to 10 ppm, of sulphate and/or
6) a content of 0.1 to 1000 ppm, preferably 0.5 to 500 ppm, of chloride, likewise based on the anhydrous product, where the sum total of lithium fluoride and the aforementioned extraneous ions does not exceed 1,000,000 ppm, based on the total weight of the technical grade lithium carbonate based on the anhydrous product.

In one embodiment, the lithium fluoride contains a content of extraneous metal ions totalling 300 ppm or less, preferably 20 ppm or less and more preferably 10 ppm or less.

The lithium fluoride of the invention, and that prepared in accordance with the invention, are especially suitable for use for preparation of fluorine-containing conductive salts for lithium ion accumulators, such as, more particularly, lithium hexafluorophosphate ($LiPF_6$), lithium fluoroperfluoroalkyl-phosphinates ($LiPF(R^F)_3$), lithium difluorophosphate ($LiPO_2F_2$), lithium hexafluoroarsenate ($LiAsF_6$), lithium hexafluorostibate ($LiSbF_6$) and lithium tetrafluoroborate ($LiBF_4$).

The invention therefore also relates to a process for preparing fluorine-containing conductive salts for lithium ion accumulators such as, more particularly, lithium hexafluorophosphate (LiPF6), lithium fluoroperfluoroalky-lphosphinates ($LiPF(R^F)_3$), lithium difluorophosphate ($LiPO_2F_2$), lithium hexafluoroarsenate ($LiAsF_6$), hexafluorostibate ($LiSbF_6$) and lithium tetrafluoroborate ($LiBF_4$), which is characterized in that the lithium fluoride of the invention or that prepared in accordance with the invention is used.

The reaction temperature in step b) may, for example, be from the freezing point to the boiling point of the aqueous medium comprising dissolved lithium carbonate used, preferably 0 to 65° C., more preferably 15 to 45° C. and more preferably 15 to 35° C., especially 16 to 24° C.

The reaction pressure in step b) may, for example, be 100 hPa to 2 MPa, preferably 900 hPa to 1200 hPa; especially ambient pressure is particularly preferred.

In step c), the solid lithium fluoride is separated from the aqueous suspension.

The separation is effected, for example, by filtration, sedimentation, centrifugation or any other process which is known to those skilled in the art for separation of solids out of or from liquids, preference being given to filtration.

If the filtrate is reused for step a) and process steps a) to c) are conducted repeatedly, a filtration through crossflow filter is preferred.

The solid lithium fluoride thus obtained typically has a residual moisture content of 1 to 40% by weight, preferably 5 to 30% by weight.

Before the lithium fluoride separated in step c) is dried in step d), it can be washed once or more than once with water or a medium comprising water and with water-miscible organic solvents. Water is preferred. Water having an electrical resistivity of 15 MΩ·cm at 25° C. or more is particularly preferred. This very substantially removes water containing extraneous ions adhering to the solid lithium fluoride from step c).

In step d), the lithium fluoride is dried. The drying can be conducted in any apparatus known to those skilled in the art for drying. The drying is preferably effected by heating the lithium fluoride, preferably to 100 to 800° C., more preferably 200 to 500° C.

Preference is given to drying down to a water content of 0.2% by weight or less, preferably 0.1% or less.

The present invention is illustrated in detail by FIG. 1.

In an apparatus for preparing lithium fluoride 1, solid lithium carbonate ($Li_2CO_3$ (s)) is suspended with water ($H_2O$) and, if the apparatus 1 is not being filled for the first time, the filtrate from the filtration unit 19 in the reservoir 3, and the lithium carbonate goes at least partly into solution. The suspension thus obtained is conveyed via line 4 by the pump 5 through a filtration unit 6, which takes the form of a crossflow filter here, with undissolved lithium carbonate being recycled into the reservoir 3 via line 7, and the filtrate, the aqueous medium comprising dissolved lithium carbonate, is introduced by the line 8 into the reactor 9. In the reactor 9, via line 10, a gas stream comprising gaseous hydrogen fluoride, which comprises gaseous hydrogen fluoride and nitrogen here, is introduced into the gas space 11 of the reactor, which is above the liquid space 12 of the reactor. The pump 13 conducts the contents of the liquid space 12, which at first consist essentially of the aqueous medium comprising dissolved lithium carbonate and are converted by the reaction to a suspension comprising solid lithium fluoride, through the line 14 to a column 15 having random packing, in which the release of the carbon dioxide formed during the reaction from the suspension is promoted. The carbon dioxide and the nitrogen utilized as a diluent are discharged via the outlet 16. After passing through the columns having random packing, the contents of the liquid space 12 conducted out of the reactor 9 flow through the gas space 11 back into the liquid space 12. The recycling through the gas space 11 has the advantage that the liquid surface area is increased, partly by passive atomization as well, which promotes the reaction with gaseous hydrogen fluoride. After the target pH has been attained or sufficient lithium fluoride has formed, the suspension of solid lithium fluoride that has arisen is conveyed by means of the pump 17 via line 18 to the filtration unit 19, which takes the form here of a crossflow filter. The solid lithium fluoride (LiF(s)) is obtained; the filtrate, the aqueous medium free of lithium carbonate or low in lithium carbonate is recycled via line 20 into the reservoir 3. Since the lithium fluoride obtained has a residual content of water, and water is also discharged via the outlet 16 together with the carbon dioxide, the supply of water ($H_2O$) to the reservoir 3, after the first filling of the apparatus 1, serves essentially to compensate for the above-described water loss in further cycles.

It will be apparent to the person skilled in the art that extraneous metal ions such as, more particularly, sodium and potassium, which form carbonates and fluorides of good water solubility, will be enriched in the circulation stream of aqueous media. However, it has been found that, even in the case of a high cycle number of 10 to 500 cycles, and even without discharge of filtrate from the filtration unit 19, it was possible to obtain a constantly high quality of lithium fluoride. It is optionally possible to discharge a portion of the filtrate from the filtration unit 19 via the outlet 20 in the valve 21, which is configured here by way of example as a three-way valve.

The recycling of the filtrate from the filtration unit 19 into the reservoir 3 makes it possible, in the case of lithium fluoride preparation, to achieve a conversion level of 95% or more, especially even of 97% or more in the case of high cycle numbers of, for example, 30 or more, "conversion level" being understood to mean the yield of high-purity lithium fluoride based on the lithium carbonate used.

Further embodiments will be apparent from the examples.

EXAMPLES

The particle size distributions reported in the examples which follow were determined using a COULTER™ LS230 particle analyser in ethanol by laser diffractometry. Three measurements were conducted per sample and—provided that no trend was apparent—averaged. Each measurement took 90 s. The results reported hereinafter are the "D10" and "D50" values, as explained above.

The analysis for anions and cations present is conducted by ion chromatography. For this purpose, the following instruments and settings are used:

Cations (DIONEX™ ICS 2100):
Column: IONPAC™ CS 16 3*250 mm analytical column with guard device
Sample volume: 1 μl
Eluent: 36 mM methanesulphonic acid of constant concentration
Eluent flow rate: 0.5 ml/min
Temperature: 60° C.
SRS: CSRS 300 (2-mm)
Anions (DIONEX™ ICS 2100):
Column: IONPAC™ AS20 2*250 mm analytical column with guard device
Sample volume: 1 μl
Eluent: KOH gradient: 0 min/15 mM, 10 min/15 mM, 13 min/80 mM, 27 min/100 mM, 27.1 min/15 mM, 34 min/15 mM
Eluent flow rate: 0.25 ml/min
Temperature: 30° C.
SRS: ASRS 300 (2-mm)

Example 1: Preparation of High-Purity Lithium Fluoride (Inventive)

In an apparatus according to FIG. 1, the reservoir 3 was initially charged with 500 g of solid lithium carbonate of technical grade quality (purity:>98% by weight; Na: 231 ppm, K: 98 ppm, Mg: 66 ppm, Ca: 239 ppm) and 20 l of water, and a suspension was prepared at 20° C. After about five minutes, the suspension was conducted through the filtration unit 6, which took the form of a crossflow filter, and the resultant medium comprising dissolved lithium carbonate, here an aqueous solution of lithium carbonate having a content of 1.32% by weight, was conducted into the reactor 9 via line 8.

After a total of 4 kg of the medium had been pumped into the reactor 9, the feed from the filtration unit 6 was stopped and, in the reactor 9, the feed of gaseous hydrogen fluoride into the gas space 11 was commenced, with continuous pumped circulation of the medium through the pump 13, the line 14 and the column 15 having random packing. This metered addition was ended when the pH of the solution pumped in circulation was 7.0.

The resultant suspension from the reactor 9 was conveyed by means of the pump 17 and via line 18 to the filtration unit 19, which is designed here as a pressurized suction filter and filtered therein, and the filtrate, a lithium carbonate-free aqueous medium here, was conveyed via line 20 back to the reservoir 3. The lithium carbonate-free aqueous medium had a lithium fluoride content of about 0.05% by weight.

The above-described operation was repeated five times.

The water-moist lithium fluoride (148 g in total) separated in the filtration unit 19 was removed and washed three times in a further pressurized suction filter with water having a conductivity of 5 MΩ·cm at 25° C. (30 ml each time).

The lithium fluoride thus obtained was dried in a vacuum drying cabinet at 90° C. and 100 mbar.

Yield: 120 g of a fine white powder.

The product obtained had a potassium content of 0.5 ppm and a sodium content of 2.5 ppm; the magnesium content of the product was 99 ppm, the calcium content 256 ppm. The chloride content was less than 10 ppm.

The measurement of the particle size distribution gave a D50 of 45 μm and a D10 of 22 μm. The bulk density was 1.00 g/cm$^3$.

Over the course of performance of 50 cycles (repetitions), a total of 97% of the lithium used was obtained in the form of high-purity lithium fluoride.

Example 2 (Inventive)

In an apparatus according to FIG. 1 except that it had, in line 8, a flow column having a bed of the ion exchanger LEWATIT™ TP207, a copolymer of styrene and divinylbenzene containing iminodiacetic acid groups, the reservoir 3 was initially charged with 500 g solid lithium carbonate of technical grade quality (purity:>98% by weight; Na: 231 ppm, K: 98 ppm, Mg: 66 ppm, Ca: 239 ppm) and 20 litres of water, and a suspension was prepared at 20° C. After about five minutes, the suspension was conducted through the filtration unit 6, which took the form of a crossflow filter, and the resultant medium comprising dissolved lithium carbonate, here an aqueous solution of lithium carbonate having a content of 1.32% by weight, was conducted into the reactor 9 via line 8 and the above-described flow column. The further conversion was effected according to Example 1.

The ion exchanger used was washed beforehand by rinsing with an about 1% lithium carbonate solution until the water leaving it had a sodium content of <1 ppm.

Yield: 149.8 g of a fine white powder.

The product obtained had a potassium content of 0.5 ppm and a sodium content of 1 ppm; the magnesium content of the product was 13 ppm, the calcium content 30 ppm. The chloride content was less than 10 ppm.

The measurement of the particle size distribution gave a D50 of 36 μm and a D10 of 14 μm. The bulk density was 0.91 g/cm$^3$.

Example 3: Preparation of Electrolyte Solutions Containing Lithium Hexafluorophosphate A mixture of about 1.03 mol/h of gaseous hydrogen fluoride and 0.21 mol/h of gaseous phosphorus trichloride was passed through a metal tube having a length about 6 m and an internal diameter of 8 mm, which had been heated to 450° C. 8 l/h of chlorine were introduced into this reaction mixture and the reaction mixture was passed through a further metal tube of length about 4 m which had been heated to 250° C.

The gaseous reaction product was cooled to room temperature and then passed via a TEFLON™ (polytetrafluoroethylene) frit through a stainless steel tube having a TEFLON™ inner tube having an internal diameter of 45 mm which had been charged up to a fill height of 190 mm with a lithium fluoride powder (300.0 g), prepared according to example 1. During the reaction, the lithium fluoride powder was stirred with a stirrer. The flow rate was about 40 l/h.

The gas mixture that left the reactor was collected in an aqueous potassium hydroxide solution (15% by weight).

After a reaction time totalling 7 hours, the metered addition of the reactants was replaced by the metered addition of an inert gas, and the reactive gas was displaced from the system.

By washing the solid reaction residue with anhydrous acetonitrile, it was possible to isolate and detect a total of 76.9 g of lithium hexafluorophosphate. The remaining, unconverted lithium fluoride was reused for further experiments.

The acetonitrile was evaporated with exclusion of water and oxygen, and a sufficient amount of the residue obtained was taken up in a mixture of dimethyl carbonate and ethylene carbonate (1:1 w/w) that an 11.8% by weight solution of lithium hexafluorophosphate was obtained. The solution was characterized, inter alia, as follows:

| | |
|---|---|
| Na | <3 ppm |
| K | <1 ppm |
| Ca | <1 ppm |
| Mg | <1 ppm |
| sulphate | <1 ppm |
| chloride | <1 ppm |

Example 3a: Preparation of Electrolyte Solutions Containing Lithium Hexafluorophosphate A mixture of about 1.03 mol/h of gaseous hydrogen fluoride and 0.21 mol/h of gaseous phosphorus trichloride was passed through a metal tube having a length about 6 m and an internal diameter of 8 mm, which had been heated to 280° C. 8 i/h of chlorine were introduced into this reaction mixture and the reaction mixture was passed through a further metal tube of length about 12 m which had been cooled to 5° C.

The gaseous reaction product was cooled to room temperature and then passed via a TEFLON™ frit through a stainless steel tube with a TEFLON™ inner tube having an internal diameter of 65 mm which had been charged up to a fill height of 110 mm with a lithium fluoride powder (300.0 g), prepared according to example 1. During the reaction, the lithium fluoride powder was stirred with a stirrer. The flow rate was about 40 l/h.

The gas mixture that left the reactor was collected in an aqueous potassium hydroxide solution (15% by weight).

After a reaction time totalling 7 hours, the metered addition of the reactants was replaced by the metered addition of an inert gas, and the reactive gas was displaced from the system.

By washing the solid reaction residue with anhydrous acetonitrile, it was possible to isolate and detect a total of 76.9 g of lithium hexafluorophosphate. The remaining, unconverted lithium fluoride was reused for further experiments.

The acetonitrile was evaporated with exclusion of water and oxygen, and a sufficient amount of the residue obtained was taken up in a mixture of dimethyl carbonate and ethylene carbonate (1:1 w/w) that, after filtration through a 200 nm TEFLON™ membrane, an 11.8% by weight solution of lithium hexafluorophosphate was obtained. This solution was characterized, inter alia, as follows:

| | |
|---|---|
| Na | <3 ppm |
| K | <1 ppm |
| Ca | <1 ppm |
| Mg | <1 ppm |
| sulphate | <1 ppm |
| chloride | <1 ppm |

Example 4 (For Comparison)

Analogously to Example 2, a commercially available 98% by weight lithium fluoride from Alfa Aesur was used. This lithium fluoride had a D10 of 0.43 μm and a D50 of 4.9 μm. The bulk density was 0.65 g/cm$^3$. The experiment was stopped after a few minutes since a massive discharge of lithium fluoride, which was increasingly blocking the lines in flow direction, was observed.

Example 5 (For Comparison)

Analogously to Example 3, a commercially available 99% by weight lithium fluoride from Sigma-Aldrich was used. This lithium fluoride had a D10 of 2.3 μm and a D50 of 370 μm. The bulk density was 0.65 g/cm$^3$. The experiment was likewise stopped after a few minutes since a massive discharge of lithium fluoride, which was increasingly blocking the lines in flow direction, was observed.

What is claimed is:

1. Lithium fluoride having a D50 of 20 to 200 μm, a D10 of 10 μm or more, a bulk density of 0.9 g/cm$^3$ to 1.2 g/cm$^3$, and a purity level of 99.9000 to 99.9995% by weight, based on anhydrous product.

2. The lithium fluoride according to claim 1, wherein the lithium fluoride has a D10 of 15 μm or more.

3. The lithium fluoride according to claim 1, wherein the lithium fluoride has a content of 0.1 to 75 ppm of sodium in ionic form, and a content of 0.01 to 10 ppm of potassium in ionic form.

4. The lithium fluoride according to claim 1, wherein the lithium fluoride has:
   a D10 of 15 μm or more;
   a purity level of 99.9700 to 99.9995% by weight, based on anhydrous product; and
   a content of 0.5 to 5 ppm of sodium in ionic form, and a content of 0.1 to 1 ppm of potassium in ionic form.

5. A process for preparing lithium fluoride having a D50 of 20 to 200 μm, a D10 of 10 μm or more, a bulk density of 0.9 to 1.2 g/cm$^3$, and a purity level of 99.9000 to 99.9995% by weight based on anhydrous product, the process comprising:
   a) reacting an aqueous medium comprising dissolved lithium carbonate with gaseous hydrogen fluoride to give an aqueous suspension of solid lithium fluoride;
   b) separating the solid lithium fluoride from the aqueous suspension; and
   c) drying the separated lithium fluoride.

6. The process according to claim 5, wherein the aqueous medium comprising dissolved lithium carbonate contains more than 2.0 g/l of lithium carbonate.

7. The process according to claim 5, wherein the aqueous medium comprising dissolved lithium carbonate contains a proportion by weight of at least 50% by weight of water, based on the total weight of the aqueous medium.

8. The process according to claim 5, wherein the aqueous medium comprising dissolved lithium carbonate additionally comprises a complexing agent, in an amount of 0.001 to 1% by weight, based on the total weight of the aqueous medium comprising dissolved lithium carbonate.

9. The process according to claim 8, wherein:
the aqueous medium comprising dissolved lithium carbonate comprises:
   7.2 to 15.4 g/l of lithium carbonate,
   at least 90% by weight of water, and
   0.005 to 0.2% by weight of the complexing agent, and
      has a pH of 9.0 to 11.5, measured or calculated at 20° C. and 1013 hPa; and
the process further comprises effecting the reaction in step a) in such a way that the resulting aqueous suspension of solid lithium fluoride attains a pH of 5.0 to 7.2.

10. The process according to claim 5, further comprising producing the aqueous medium comprising dissolved lithium carbonate by contacting solid lithium carbonate with an aqueous medium which is free of lithium carbonate or low in lithium carbonate, such that the solid lithium carbonate goes at least partly into solution.

11. The process according to claim 10, wherein the solid lithium carbonate has a purity level of 95.0 to 99.9% by weight, based on the anhydrous product, and contains extraneous ions in
   1) a content of 200 to 5000 ppm of sodium in ionic form and/or
   2) a content of 5 to 1000 ppm of potassium in ionic form and/or
   3) a content of 50 to 1000 ppm of calcium in ionic form and/or
   4) a content of 20 to 500 ppm of magnesium in ionic form,
   where the sum total of lithium carbonate and the extraneous ions 1) to 4) does not exceed 1,000,000 ppm, based on the total weight of the lithium carbonate based on the anhydrous product.

12. The process according to claim 10, wherein:
the process further comprises repeating steps a) to c) once or more than once, and
the aqueous medium which is free of lithium carbonate or low in lithium carbonate is an aqueous medium which is obtained from step b) in the separation of the solid lithium fluoride from the aqueous suspension.

13. The process according to claim 10, wherein the solid lithium carbonate has a purity level of 98.5 to 99.8% by weight, based on the anhydrous product, and contains extraneous ions in
   1) a content of 500 to 1200 ppm of sodium in ionic form and/or
   2) a content of 10 to 600 ppm, of potassium in ionic form and/or
   3) a content of 100 to 400 ppm of calcium in ionic form and/or
   4) a content of 50 to 100 ppm of magnesium in ionic form,
   where the sum total of lithium carbonate and the extraneous ions 1) to 4) does not exceed 1,000,000 ppm, based on the total weight of the lithium carbonate based on the anhydrous product.

14. The process according to claim 5, wherein the aqueous medium comprising dissolved lithium carbonate has a pH of 8.5 to 12.0, measured or calculated at 20° C. and 1013 hPa.

15. The process according to claim 5, further comprising passing the aqueous medium comprising dissolved lithium carbonate over an ion exchanger in order to at least partly remove calcium and magnesium ions.

16. The process according to claim 5, further comprising effecting the reaction in step a) by introducing or passing a gas stream comprising gaseous hydrogen fluoride into or over the aqueous medium comprising dissolved lithium carbonate, or by spraying or nebulizing the aqueous medium comprising dissolved lithium carbonate into or through a gas comprising gaseous hydrogen fluoride, or causing the aqueous medium comprising dissolved lithium carbonate to flow, into or through a gas comprising gaseous hydrogen fluoride.

17. The process according to claim 5, further comprising effecting the reaction in step a) in such a way that the resulting aqueous suspension of solid lithium fluoride attains a pH of 3.5 to 8.0.

18. The process according to claim 5, wherein the process is conducted so as to attain a conversion level of 95% or more.

* * * * *